Figure 1:
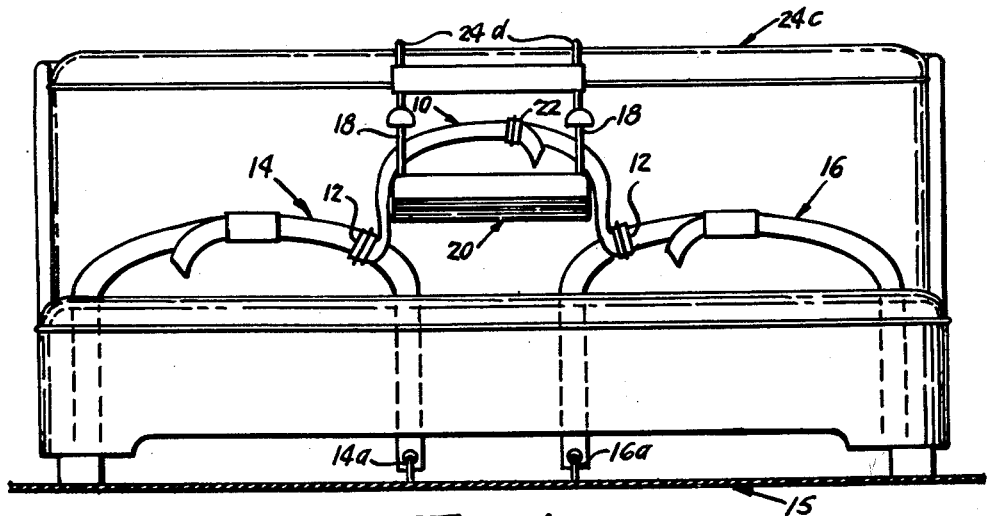

June 1, 1965            G. B. LUCAS            3,186,762

SAFETY SEAT BELT COMBINATION FOR VEHICLES

Filed Jan. 31, 1964

INVENTOR.
GARY B. LUCAS
BY Kimmel & Crowell
ATTORNEYS.

United States Patent Office 3,186,762
Patented June 1, 1965

3,186,762
SAFETY SEAT BELT COMBINATION FOR VEHICLES
Gary B. Lucas, Rte. 4, Box 323, W. 11th Ave., Chico, Calif.
Filed Jan. 31, 1964, Ser. No. 341,653
5 Claims. (Cl. 297—385)

This invention relates to safety attachments within conventional vehicles, and more particularly to a child and adult safety belt combination in an automobile and the like.

It is often necessary that parents take their infant child with them while shopping, and traveling in a vehicle and the like, which creates a problem of safety of the child should the vehicle suddenly stop and throw the infant riding on a front of a vehicle into the windshield or instrument panel of the vehicle injuring the child.

This invention solves the above problems by providing a safe means of allowing an infant to sit beside the driver without hazardously diverting the driver's attention away from the driving of the vehicle in an emergency situation.

A primary object of this invention is to provide a safe and dependable means of holding an infant child between the driver and passenger seats of a conventional vehicle during travel.

Another object of the invention is to provide a child and adult safety belt combination wherein an infant child may be safely secured between two passengers on the front seat of a conventional traveling vehicle.

A further object of the invention is to provide an auxiliary safety belt means for quick attachment to two adjacent safety seat belt means.

Another object of this invention is to provide a means of quickly installing an auxiliary safety belt combination for a plurality of passengers on a car seat, which will adjustably fit various sizes of occupants and requires a minimum of inconvenience during installation and use thereof.

A still further object of this invention is to provide a combined infant and adult safety belt attachment for vehicular seats which will require a minimum of adjustment incident to use thereof.

Yet another object of this invention is to provide a plurality of safety belt attachments requiring a minimum of effort in installation thereof.

A further object of the invention is to provide a quick engaging and release buckle means for securely adjusting, fastening and releasing a seat belt means.

Yet another object of the invention is to provide an auxiliary safety seat belt means which is adapted to be quickly attached to two adjacently installed safety seat belts without installing additional attaching or securing means to the front seat of an automobile and the like.

Figure 2:
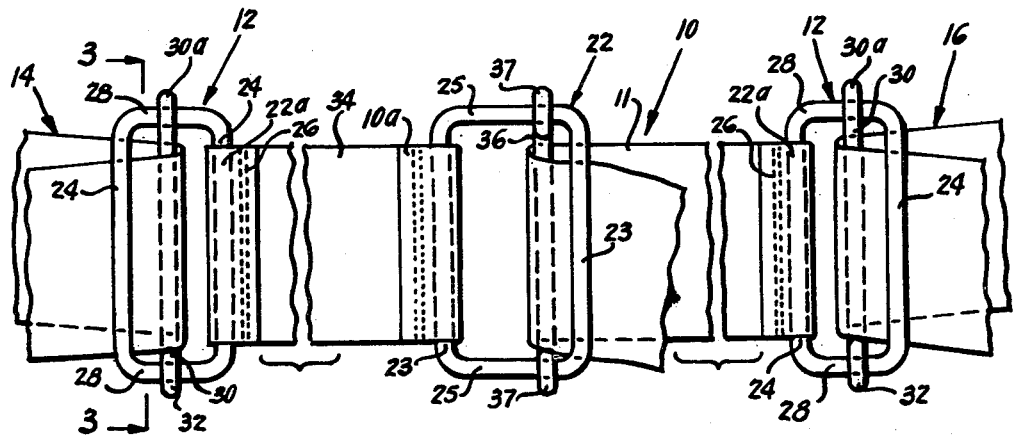
Figure 3:
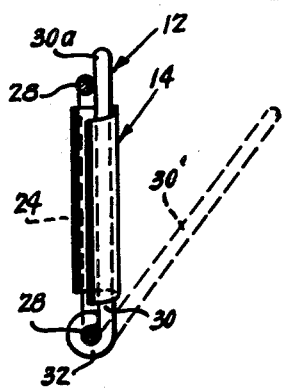

Other objects and many of the attendant advantages of the instant invention reside in the construction and operation of the invention as will be readily appreciated as the same becomes better understood by reference to the following detailed description when considered in connection with the accompanying drawing, in which:

FIGURE 1 is a fragmentary front elevational view of the front seat of a vehicle showing the conventional driver and passenger seat belts having the auxiliary or infant's seat belt of this invention secured thereto and passed over a conventional child's car seat;

FIGURE 2 is an enlarged fragmentary view in front elevation, partially broken away showing the manner in which the infant's or auxiliary seat belt is detachably connected to and between the conventional driver and passenger seat belts; and FIGURE 3 is a transverse cross-sectional view taken substantially on line 3—3 of FIGURE 2 showing an attaching position of one of the elements of the side buckle means in dotted lines.

Referring now to the drawing wherein like reference characters designate like parts, FIGURES 1, 2, and 3 illustrate a preferred embodiment of the invention comprised, in general, of an infant's or auxiliary set belt 10, adjacently attached by buckles 12 to a passenger's safety seat belt 14 and a driver's seat belt 16.

When used with a child or infant, seat belt 10 is looped through standards 18 of a conventional infant's car seat 20 and secured over the lap of a child therein by novel buckle 22 to prevent the child from falling out of seat 20 and being thrown against the windshield of the car. The auxiliary seat belt 10 of this invention also prevents the seat 20 from bouncing upwardly and becoming disengaged from where it is hooked over the back of the front seat 24c of an automobile and the like by arms 24d. Of course, when the auxiliary safety seat belt 10 is used for an adult medial third passenger in the front seat 24c of the vehicle, infant seat 20 may be omitted allowing safety belt 10 to be fastened around the intermediate passenger by using buckle 22, as best shown in FIGURE 2, and as will be understood by those skilled in the art.

In the use of the instant invention, the auxiliary safety seat belt 10 may be quickly attached between adjacently installed seat belts 14 and 16, as already described. When not in use, auxiliary safety seat belt 10 may be quickly removed and conveniently carried in a glove compartment or the the like until use thereof is desired.

Seat belt 10 may me made either of plastic, leather, fabric, rubber, cloth or other suitable materials, as desired.

Referring more specifically to FIGURES 2 and 3, buckles 12 are securely attached to auxilary safety belt 10 by end portions 22a of belt 10 being threaded through and looped around a side portion 24 of each buckle 12 and sewn along seam 26, as best shown in FIGURE 2. Of course, if plastic, rubber or other similar material is used therefor, end portions 22a of auxiliary safety belt 10 may be molded or integrally formed and fixedly secured therearound in any desired manned, as understood by those skilled in the art.

Each buckle 12 is formed of a rectangular closed loop having side portions 24 and end portions 28 and an intermediate slidable link 30 having lower end portions 32 thereof bent around the lower end portion 28 to allow the same to be pivoted to the attaching position 30' shown in dotted lines in FIG. 3 for securing one side portion of belt 14 or 16.

To fasten seat belt 14 or 16 to buckle 12, one end of the same may be threaded through and looped back around slidable link 30 allowing the link to fixedly engage the threaded end of belt 14 or 16 against side 24 of buckle 12, as best shown in FIG. 2. Alternately the link 30 may be pivoted to the dotted position 30' shown in FIG. 3 and the belt 14 or 16 passed thereover without the necessity of threading the end of the same therethrough.

Intermediate buckle 22 is likewise fastened to left end portion 34 of belt 10 by end portion 34 thereof being looped around side portion 23 of buckle loop 22, and sewn as a seam 10a, as shown in FIG. 2.

Intermediate buckle 22 is comprised of a buckle loop having parallel side portions 23 and parallel end portions 25 formed as a closed rectangle coacting with intermediate link 36 slidably secured at both ends by a looped eye or aperture means 37 around end portions 25.

One of the novel structures of this invention resides in the use of buckles 12 as a quick securing means and release means of auxiliary belt 10 to the conventional safety belts 14 and 16 by permitting non-threading of the conventional safety belts through buckles 12 and around link 30. By merely pivoting or rotating the link 30 about its bent lower end portion 32 to the dotted position 30', quick assembly and disassembly may be effected. In use, the link 30 is straightened up so that its upper end 30a engages the upper end 28 of the buckles 12 to retain the conventional belts 14 or 16 in place.

During installation or use of auxiliary belt 10, intermediate portions of seat belts 14 and 16 are passed over pivoted slidable link 30 and adjusted to the proper position. The end of belt 10 is then threaded around link 36 of a buckle 22 to tighten the belt over the child in the seat 20.

It will be understood that a fast action buckle such as shown at 12 may be used in place of the intermediate buckle 22, if desired.

From the foregoing it will now be seen that there is herein provided a new and improved safety seat belt combination and buckle means for vehicles which accomplishes all the objects of this invention, and others, including many advantages of great practical utility and commercial importance.

It is to be understood, of course, that the foregoing disclosure relates to a preferred embodiment of the invention as illustrated, that various modifications and changes may be made in the invention by those skilled in the art without departing from the spirit and scope of the invention as set forth in the appended claims.

I claim:

1. A safety seat belt combination for vehicles comprising two adjacent conventional seat belts, an auxiliary seat belt for an infant seat hooked over the back of the passenger seat of a vehicle, a pair of end buckles by which said auxiliary seat belt is fastened to and between said adjacent conventional seat belts, and an intermediate buckle for securing the ends of the auxiliary seat belt around an infant passenger seated in said infant seat.

2. A safety seat belt combination for vehicles as in claim 1, wherein said end buckles are each comprised of a rectangular loop having a link slidably mounted thereon for adjustably securing said auxiliary seat belt to said adjacent seat belts.

3. A safety seat belt combination for vehicles as in claim 2, wherein said intermediate buckle comprises a closed buckle loop and a slidable intermediate link thereon cooperating to adjustably fasten the free ends of said auxiliary seat belt together.

4. A safety seat belt combination for vehicles comprising an auxiliary safety seat belt interconnected to two conventional safety seat belts, end buckles adapted to quickly secure said auxiliary safety seat belt to said conventional safety seat belts, and an intermediate buckle for quickly securing the ends of the auxiliary safety seat belt together about a passenger.

5. A safety seat belt combination for vehicles comprising an auxiliary safety seat belt as in claim 4, wherein said end buckles each comprise a closed buckle loop having parallel ends and parallel sides, and a link pivotally fastened to one of said ends and adapted to be rotatably closed against the other parallel end of said buckle loop, said end buckle loop and said cooperating link securely fastening the ends of said auxiliary safety seat belt to said conventional safety seat belts.

References Cited by the Examiner

UNITED STATES PATENTS

| | | | |
|---|---|---|---|
| 1,512,087 | 10/24 | Fish | 24—188 |
| 2,554,964 | 5/51 | Stephan | 24—188 |
| 2,777,502 | 1/57 | Travis | 297—250 |
| 2,876,829 | 3/59 | Johnson | 297—390 |
| 2,947,353 | 8/60 | Wimmersperg | 297—388 X |
| 3,136,579 | 6/64 | Hunter | 297—385 X |

FRANK B. SHERRY, *Primary Examiner.*